United States Patent [19]

Lancor, Jr., deceased et al.

[11] 3,967,888

[45] July 6, 1976

[54] IMAGE DISPLAY FROM CONTINUOUSLY MOVING IMAGE CARRIER

[75] Inventors: Joseph H. Lancor, Jr., deceased, late of Arcadia, Calif., by Ellen B. Lancor, administratrix; Leonard A. Ferrari, San Clemente, Calif.

[73] Assignee: Bell & Howell Company, Chicago, Ill.

[22] Filed: Nov. 13, 1970

[21] Appl. No.: 89,323

[52] U.S. Cl.................................. 352/109; 352/40
[51] Int. Cl.² ........................................ G03B 41/10
[58] Field of Search ........... 352/105, 106, 109, 110, 352/40

[56] References Cited
UNITED STATES PATENTS

| | | | |
|---|---|---|---|
| 2,506,198 | 5/1950 | Charles | 352/109 |
| 2,843,006 | 7/1958 | Tyler | 352/109 |
| 3,067,284 | 12/1962 | Baldwin | 352/109 X |

*Primary Examiner*—Monroe H. Hayes
*Attorney, Agent, or Firm*—Benoit Law Corporation

[57] ABSTRACT

Image display from a continuously moving image carrier with the aid of a repeatedly advanced and reset optical compensator is improved by omitting the traditional compensator bias spring and resetting the compensator with electric power pulse doublets. A substantially constant driving torque may be provided for the compensator in proportion to a damping term of the compensator equation of motion. An electric bias may alternatively or additionally be provided for biasing the compensator during image display against the direction of advance motion. Decelerating power may selectively be applied to the compensator to prevent or correct overshooting in the advance direction.

17 Claims, 9 Drawing Figures

JOSEPH H. LANCOR, JR., DECEASED
BY ELLEN B. LANCOR, HIS ADMINISTRATRIX,
and LEONARD A. FERRARI
INVENTORS.

BY *Frm. P. Benoît*
ATTORNEY.

IMAGE DISPLAY FROM CONTINUOUSLY MOVING IMAGE CARRIER

BACKGROUND OF THE INVENTION

1. Field of the Invention

The subject invention relates to optics and, more particularly, to the display of images from a continuously moving image carrier.

2. Description of the Prior Art

In 1895 the pioneering brothers Lumière made their first demonstration of motion picture projecton on a screen. Shortly thereafter they devised an improvement of their cinematograph for the projection of motion pictures from a continously moving film. As may, for instance, be seen from their U.S. Pat. No. 634,560, issued Oct. 10, 1899, this machine already manifested in some mechanistic form fundamental concepts that would benefit a modern motion picture projector.

For one thing, the film motion was continuous, which imposes much less wear and tear on film and film drive mechanism than an intermittent film advance. Also, continuous film motion would have been more compatible with the provision and playback of sound recordings on the film and, half a century later, with the scanning of motion pictures by television equipment.

Secondly, the continuous Lumière cinematograph operated with a single motion compensating element. This compares very favorably in terms of equipment, maintenance, size and cost to the many proposals that employ a multitude of rotating lenses, mirrors or prisms and that are thus very expensive, bulky and in continual need of repair or maintenance by skilled and specially trained personnel.

Two further elements of the Lumière apparatus, namely a sawtooth cam for periodically advancing and resetting the film motion compensating element, and a spring for biasing that element, set the path for further development up to the present time. As will presently be shown, the chronic inability of the art to break away from Lumiéres' cam and spring concept bears the responsibility for the persistent predominance of the intermittent projector over the potentially much more advantageous continuous machine.

A sawtooth cam became a standard device for driving single-element compensators, as is particularly well illustrated in the first figure of U.S. Pat. 2,718,549, by C. F. Mattke, issued Sept. 20, 1955. After many years of development, it was recognized that a feature for correcting effects of film shrinkage and other imperfections is an indispensable necessity. Accordingly, an error correcting element was added to the film motion compensating element, as may be seen from U.S. Pat. 2,227,054, by A. V. Bedford, issued Dec. 31, 1940. Since purely mechanical systems proved incapable of satisfactory operation, proposals were made to provide the error-correction feature by an electronic servo system.

According to one of these proposals (see U.S. Pat. 2,666,356, by R. E. Graham and C. F. Mattke, issued Jan. 19, 1954), Bedford's film motion compensating element was replaced by a rotating drum structure which had a crown of spring-biased rocking mirrors for routinely compensating for the continuous film motion irrespective of film shrinkage and other imperfections occurring during the display. An error correcting element in the form of an auxiliary mirror was provided in addition to the mirror drum. This auxiliary mirror was actuated by an electronic servo system which sensed errors in the stationary positioning of the projected image in at least two directons and which adjusted the auxiliary mirror accordingly.

Shortly after this proposal the further suggestion was made to combine both the film motion compensation function and the error correction feature in one and the same mirror element (see U.S. Pat. 2,770,163, by C. F. Mattke, issued Nov. 13, 1956). To this end, the mirror element was routinely driven by a cam to perform the requisite continuous motion compensation, and a servo system of the type mentioned in the preceding paragraph was made to act on that same mirror element for the purpose of error correction.

In the meantime the search for a solution which would overcome the inadequacies of mechanical drive systems for the compensator yielded the replacement of the erstwhile sawtooth cam by an electronic sawtooth generator, as may be seen from U.S. Pat. 2,506,198, by D. Charles, issued May 2, 1950. In the case of electromechanical compensator elements, it proved, however, difficult to effect an error correction by changing the routine sawtooth oscillation of the compensator.

In time it was found that the presence of a sawtooth function generator was not indispensable. With a spring-biased compensator element, an electric current of gradually increasing magnitude could automatically be provided by a servo amplifier that was connected to a photocell sensor which detected movements of an illuminated sprocket hole (see U.S. Pat. 2,843,006, by A. W. Tyler, issued July 15, 1958; and U.S. Pat. 3,067,284, by J. L. E. Baldwin, issued Dec. 4, 1962).

It had become clear by this time that a spring bias of the compensator element could not practically serve as the only agency for resetting this element. Rather, a recurring resetting current came to be applied to the compensator element in order to assist the bias spring in resetting the compensator, and also in order to permit a synchronization facility in the case of motion picture scanning for television purposes (see the above mentioned Tyler Pat. 2,843,006).

The application of reset pulses permitted the use of weaker bias springs. This yielded some reduction in the amplitude of the driving sawtooth current, since the drive of the compensating element has to work against the bias spring stiffness. A further improvement resulted from the realization that the compensator element could be biased in a mid-position between its outer limits of reciprocating travel. In this manner, the extreme amplitude of the drive current was virtually cut in half. However, the resulting improvement was largely nullified by the lack of a restoring force against overshooting of the compensator advance during the initial one-half of the compensator advance.

Accordingly, all these proposals, representing an immense development effort for the better part of the present century, did not yield the solution required for a displacement of the intermittent motion picture projector on a broad scale. As initially indicated, the responsibility for this failure rests with the persistent inability of the art to break away from Lumières' cam and spring concept when moving from the mechanical age into the electronic era.

The belief in the indispensable necessity of a bias spring has become that engrained that many illustrations of prior-art continuous film motion projectors do no longer show the spring; assuming tacitly its presence. Even systems that were constructed apparently with a view to bidirectional image correction still fell back to the traditional cam (or sawtooth current) and spring concept for the mirror drive, thereby reopening the door to the host of obstacles besetting that approach.

The advent of television and the use of video equipment sawtooth generators for compensator deflection purposes contributed further to the adherence to sawtooth drive concepts, as may be seen from the LASER DISPLAY STUDY by C. E. Baker and H. W. Parker, Technical Report No. RADC-TR-65-169 (Rome Air Development Center, Griffiss Air Force Base, New York, July 1965).

In consequence, workers in the field wishing to elaborate on more promising servo loop principles were faced with an alternative between proposals which required sawtooth driving currents of such high amplitudes that overheating of the drive coil or thermal warping of the mirror resulted, and suggestions which left significant portions of the mirror advance practically uncorrected.

SUMMARY OF THE INVENTION

The subject invention owes its existence to a radical departure from the above mentioned rigid course of development that stymied the advent of comparatively inexpensive, low-maintenance continuous motion picture machines for many years.

From one aspect thereof, the subject invention is concerned with a method of displaying images of a succession of recordings from a substantially continuously moving carrier, with the aid of an electrically powered optical compensator of a type having a driven compensator part which is repeatedly advanced through a range of motion to compensate for the continuous carrier movement, and which is reset between successive advancements. In connection with this method, the invention resides in the improvement which comprises the step of advancing the driven compensator part in accordance with substantially the following equation of motion:

$$F(t) = J \frac{d^2x}{dt^2} + b \frac{dx}{dt}$$

where $F(t)$ = force for advancing the driven compensator part;
$J$ = mass-moment of inertia of the driven compensator part;
$b$ = damping coefficient of the driven compensator part;
$\frac{dx}{dt}$ = velocity of the driven compensator part;
$\frac{d^2x}{dt^2}$ = acceleration of the driven compensator part.

The improvement presently under consideration further comprises the following steps, all in combination with the step defined in the preceding paragraph.

Relative movements of each displayed image are sensed, the application of electric power to the compensator is controlled in response to sensed image movements to advance the driven compensator part through said range of motion to render the display of each image substantially stationary, electric resetting power comprising an electric power pulse doublet is provided for each reset of the driven compensator part, and the electric resetting power comprising the electric power pulse doublet is applied to the compensator for resetting the driven compensator part through the above mentioned range of motion upon completion of the display of an image and preparatory to the display of the next image.

A power pulse doublet may for present purposes be defined as a pair of oppositely poled electric power pulses. For instance, if an electric power pulse that drives the compensator in an advance direction is designated as positive-going, while an electric power pulse that drives the compensator in a resetting direction is designated as negative-going, then a suitable power pulse doublet for resetting the driven compensator part is composed of a negative-going electric power pulse followed by a positive-going electric power pulse.

The combination just recited is of a synergistic nature, inasmuch as the combination of the above mentioned construction and mounting of the driven compensator part and the reset of the compensator by a power pulse doublet yields a result that is significantly greater than the sum of the individual effects of these features. For instance, if the claimed power pulse doublet compensator reset is used in conjunction with a spring or tension wire-biased compensator as shown in pages 32 to 36 of the above mentioned Laser Display Study, then the traditional sawtooth power currents for driving the compensator still occur, as may be seen frm FIG. 26 of that Study. By eliminating the spring bias in accordance with the above equation of motion, the sawtooth form of the compensator drive currents is also eliminated. As will be shown in the further course of this disclosure, the effect of the damping coefficient in the above equation and a substantially constant driving torque provided in response to that damping coefficient combine to effect advancement of the compensator at a substantially stable tracking error, thereby largely avoiding jitter in the displayed images. Since the peak amplitude of the driving current providing that substantially constant torque is smaller than the peak amplitude of sawtooth drive currents employed in prior-art spring-biased compensator systems, it follows that the resetting of the compensator by pulse doublets is not delayed by strong countervailing drive current amplitudes.

Another aspect of the subject invention is concerned with a method of displaying images of a succession of recordings from a substantially continuously moving carrier, with the aid of an electrically powered optical compensator of a type being repeatedly advanced through a range of motion to compensate for the continuous carrier movement, and being reset between successive advancements. In connection with this method, the invention resides in the improvement which comprises, in combination, the steps of providing an electrical bias for the compensator, applying the electric bias to the compensator to provide during image display a biasing force at the compensator in a direction opposed to the direction of compensator advance during image display, sensing relative movements of each displayed image, controlling the application of electric power to the compensator in response to sensed image movements to render the display of each image substantially stationary, providing for each compensator reset electric resetting power comprising an electric power pulse doublet, and applying the electric resetting power comprising the electric power pulse doublet to the compensator for resetting the compensator through the range of motion upon completion of the display of an image an preparatory to the display of the next image.

The combination just recited is also of a synergistic nature, inasmuch as the combination of the electric compensator bias and the compensator reset by a power pulse doublet yields a result that is significantly greater than the sum of the individual effects of these features. As mentioned above, if the claimed power pulse doublet compensator reset is used in conjunction with a spring or tension wire-biased compensator as shown in pages 32 to 36 of the above mentioned Laser Display Study, then the traditional sawtooth power currents for driving the compensator still occur, as may be seen frm FIG. 26 of that Study. A similar problem would occur if the claimed electric compensator bias were employed in conjunction with the traditional spring or torsion wire reset for the compensator. In that case, the electric compensator bias would tend to obviate the need for a biasing spring against overshooting of the compensator in the advance direction. However, the conventional sawtooth power currents for driving the compensator would still be necessary because of the presence of a spring or torsion wire for resetting purposes.

According to the subject invention, the claimed electric bias obviates the need for a spring bias against overshooting of the compensator in the advance direction, while the claimed power pulse doublet obviates the need for a spring or torsion wire for compensator resetting purposes.

From a further aspect thereof, the subject invention is concerned with a method of displaying images of a succession of recordings from a substantially continuously moving carrier, with the aid of an electrically powered optical compensator of a type being repeatedly advanced by motive power through a range of motion to compensate for the continuous carrier movement. The invention according to this aspect resides in the improvement comprising in combination the steps of sensing relative movement of each displayed image in a first direction corresponding to the direction of movement of the carrier and in a second direction extending opposite to the first direction, developing and applying to the optical compensator the above mentioned motive power in response to sensed image movements in said first direction to advance the optical compensator through the range of motion to render the display of each image substantially stationary, developing decelerating power in response to sensed image movements in the second direction, and applying the developed decelerating power to the optical compensator to improve the stationary condition of displayed images for which a movement in the second direction has been sensed, and resetting the optical compensator through the range of motion upon completion of the display of substantially each image and preparatory to the display of the next image.

By developing the drive power for the optical compensator in response to sensed image movements, drive cams or equivalent electronic function generators are rendered unnecessary and the problems resulting from the use of such components are avoided. Moreover, overshooting of the compensator in the advance direction is avoided without the provision of a bias spring by the expedient of developing decelerating power in response to sensed image movements in the above mentioned second direction, and applying this decelerating power to the optical compensator to improve the stationary condition of displayed images. In this manner, two opposed forces which are both controlled by movements of the displayed image are made to bear on the compensator itself so as to improve the stability of the displayed image.

The aspects of the subject invention so far defined may be used individually or, in preferred embodiments, may be united in any useful combination.

The subject invention further provides apparatus for carrying out the methods of the invention.

BRIEF DESCRIPTION OF THE DRAWINGS

The subject invention will become more readily apparent from the following detailed description of preferred embodiments thereof, illustrated by way of example in the accompanying drawings, in which.

DESCRIPTION OF PREFERRED EMBODIMENTS

The non-intermittent or continuous motion picture projector 10 shown in FIGS. 1, 2, 3 and 4 has a film gate 12 which may be curved in accordance with well-known principles rendering the angular rate of film advance equal for different points of the film gate.

Figure 1:
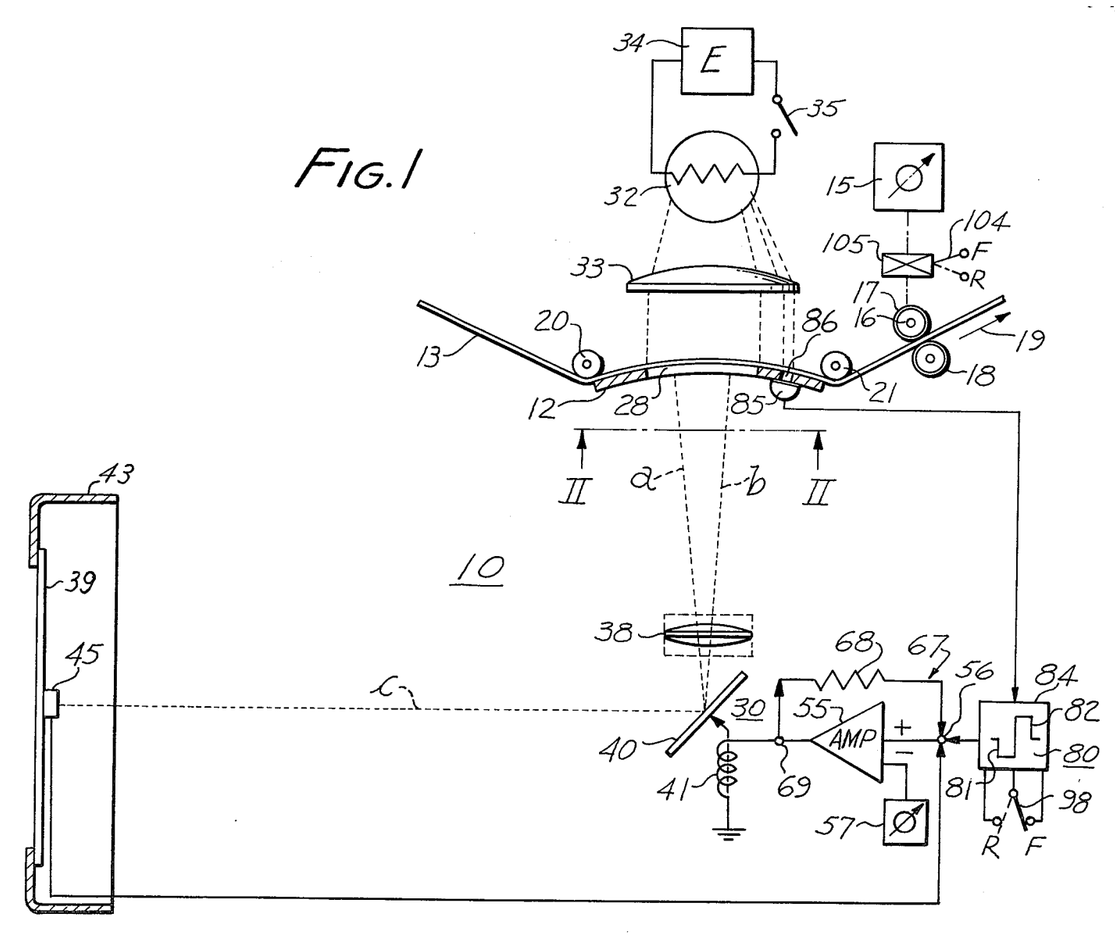
FIG. 1 is a diagrammatic illustration of a non-intermittent or continuous motion picture projector according to a preferred embodiment of the subject invention.

A conventional variable speed drive 15 has a capstan 16 which may have a rubber lining 17 that engages the film with the aid of a nip roller 18. The drive 15, which may comprise a variable-speed electric motor with reduction gear or an electric motor with variable-speed gear (not shown), is set at any practical speed to advance a motion picture film 13 through the film gate 12 in the direction of an arrow 19 at a substantially continuous or uniform rate (as distinguished from an intermittent film advance). Two guide rollers 20 and 21 assist the movement of the film into and out of the film gate.

In principle, a sprocket drive can be used for advancing the film 13. Where film sprocket holes are employed as control marks, it is, however, preferred that a capstan which does not wear out the sprocket hole areas be used as the power-transmitting device.

The film 13 bears a succession of optically reproducible recordings in the form of transparent images 23 located in image frames 24 and typically representing a filmed scene. The film further has sprocket holes 25 along a margin 26 thereof. In accordance with known principles, the film gate has a projection aperture 28 whose length is at least equal to twice the height of each image frame 24 plus the height of an interframe space 29, so that the continuous motion compensator 30 is able to handle two full image frames in succession. The width of the projection aperture is sufficient for a projection of the sprocket hole that pertains to each projected image in addition to a projection of the image.

Working with projected sprocket holes through which light is transmitted presupposes that the film margin 26 is opaque or black. This typically is, indeed, the case if the film was produced with a reversal development process. If the sprocket hole margin 26 is transparent, a non-reflecting background may be provided behind the margin 26 and light may be projected onto the margin 26. This projected light is reflected by the film in the margin 26, but not by the sprocket holes. Accordingly, instead of sensing luminous sprocket hole images against a dark background, luminous background areas relative to dark sprocket hole images may be sensed in order to determine relative motion of the projected image (see U.S. Pat. 3,067,284, by J. L. E. Baldwin, issued Dec. 4, 1962, and herewith incorporated by reference herein). Alternatively, a transparent margin of the film may be provided with opaque spots which accompany corresponding image frames 24, and which are sensed against luminous background areas. Similar expedients may be employed with the sprocket hole sensor 85 to be described below.

The film 13 at the projection gate 28 is illuminated by a projector lamp 32 and condensor lens system 33. The lamp 32, which may have a conventional reflector (not shown), is energized from an electric power source 34 upon closure of a switch 35. A projector lens system 38 projects the illuminated images and sprocket holes by way of the continuous motion compensator 30 onto a conventional back-lighted screen 39. The back-lighted screen is shown by way of example, and a front-lighted screen may be used instead.

The compensator 30 has a first-surface mirror 40 which is repeatedly advanceable by motive power applied to a coil 41 through a range of angular motion so as to compensate for the continuous movement of the film 13. The objective of the compensator mirror 40 is to maintain each projected image substantially stationary. To illustrate this principle a line $a$ in FIG. 1 approximately designates a ray through the center of an image 23 at the beginning of the projection of that image. A line $b$ approximately designates a ray through the center of the same image at the end of the particular projection. The mirror 40 is advanced to maintain the center of the projected image on a line $c$ as the center of the image on the film 13 moves from $a$ to $b$. To maintain each projected image stationary, the mirror 40 has to advance angularly by an angle corresponding substantially to one-half the angle between lines $a$ and $b$.

Since the projection aperture 28 in the film gate 12 is larger than one image, the screen 39 is provided with an opaque frame 43 which blocks from the view of the observer the projected sprocket holes and also parts of images other than the one image that is being projected for viewing at the particular time. The projector lens 38 preferably has its stop plane in front of the lens near the mirror 40 to reduce wandering of the luminous image on the mirror.

A device 45 is located at the screen for sensing relative movements of each displayed image in a first direction corresponding to the direction 19 of movement of the film 13. The device 45 also senses relative movements of displayed images in a second direction opposite the first direction just mentioned. These movements in a second direction occur, for instance, if the compensator mirror 40 overshoots in its forward motion the advance of the film at a particular moment, on while the film 13 is slowing down.

Figures 2, 3, 5, 6, 7:
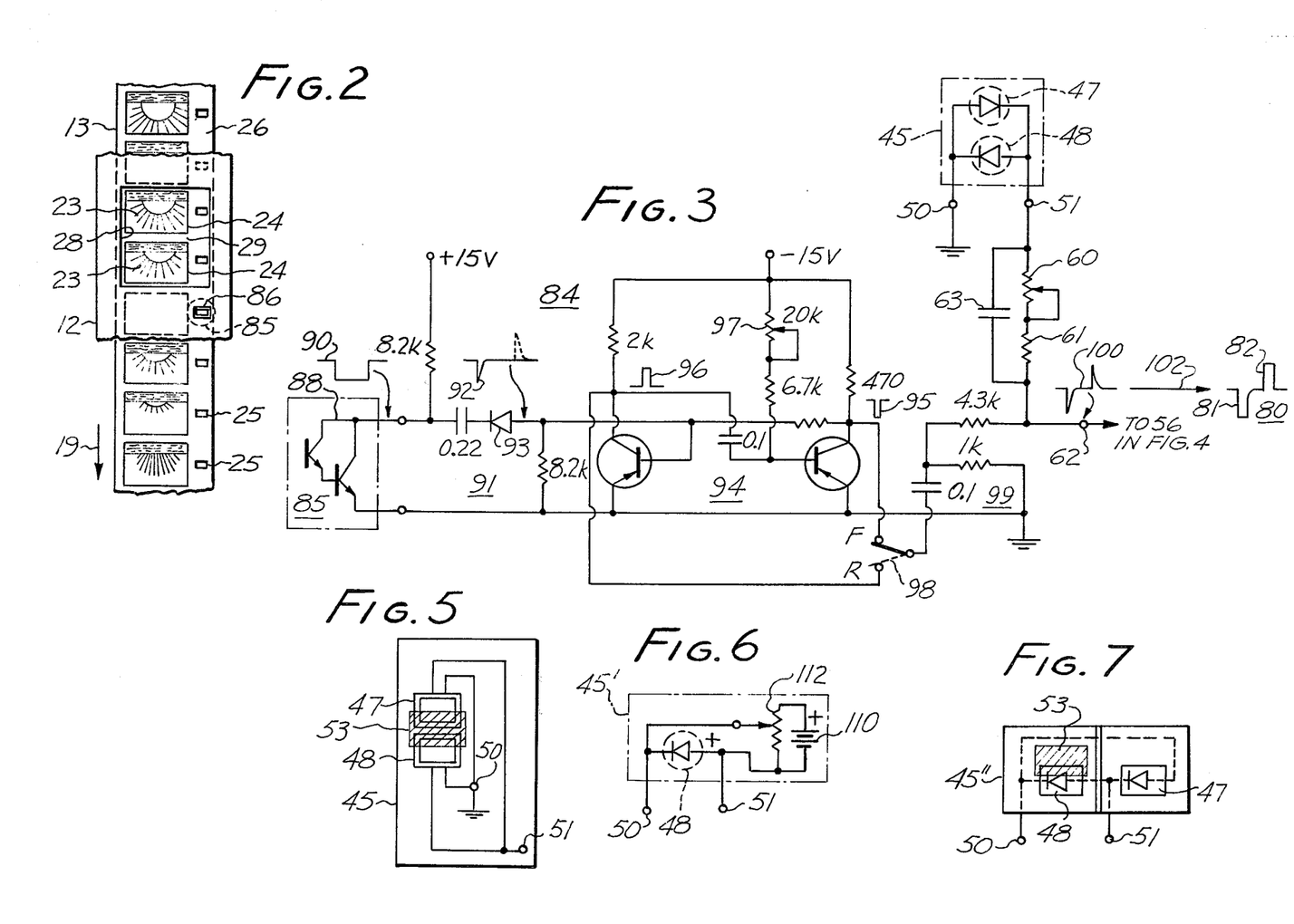
FIG. 2 is a view substantially along lines II — II of FIG. 1.
FIG. 3 is a circuit diagram of a resetting pulse generator and image motion sensor of the projector of FIG. 1.
FIG. 5 is a top view of a photocell combination that may be employed in the image motion sensor of FIGS. 1 and 3.
FIG. 6 is a diagram of an alternative image motion sensor.
FIG. 7 is a diagram of yet another image motion sensor.

By way of example and as shown in FIG. 5, the motion sensing device 45 may have two conventional photovoltaic cells 47 and 48 mounted adjacent each other. The illuminated sprocket hole appearing at the film gate 28 is projected by way of the compensator mirror 40 onto the light-sensitive parts of the photocells 47 and 48. Each of the photocells 47 and 48 produces an electric current which varies as a function of the area of cell illumination.

As shown in the schematic of FIG. 3, the cells 47 and 48 are connected in parallel and at opposite output voltage polarities between two terminals 50 and 51 of the sensing device 45. The two output signals of the cells 47 and 48 buck each other, producing no net signal across the terminals 50 and 51 when the photocells 47 and 48 receive equal portions of a projected sprocket hole 53. In the case of projected luminous sprocket holes, the cells 47 and 48 produce a zero net signal in response to equal illumination by portions of the projected sprocket hole. In the case of dark sprocket holes projected with a luminous background surrounding each dark hole, the cells 47 and 48 produce a zero net signal in response to equal illumination by portions of the luminous background above and below the projected sprocket hole.

It may be helpful to note at this juncture that the sensor 45 need not necessarily be located at the screen 39. Rather, the sensor 45 may be positioned closer to the compensator mirror 40 (such as within the projector housing), with a lens (not shown) being provided for imaging the projected sprocket hole onto the sensing device 45.

The projector 10 further includes an amplifier 55 for energizing the compensator coil 41 that moves above the mirror 40. In accordance with an important aspect of the subject invention, no routine sawtooth motion is imposed on the compensator mirror 40. Rather, the mirror is only advanced in accordance with the then prevailing needs of the system aiming at a stabilization of displayed images in a substantially stationary condition. Since the film 13 is moving, a centered sprocket hole will not stand still in the absence of mirror advance, but will move quickly in a first direction that corresponds to the direction of movement of the film. This produces at the terminals 50 and 51 a net voltage that is applied to the input 56 of the amplifier 55.

This net input voltage causes the amplifier 55 to develop and apply to the compensator coil 41 motive power for angularly moving the compensator mirror in such a sense as to reduce movement of the projected sprocket hole in the named first direction. The compensator mirror will then be advanced in accordance with a stable, substantially constant angular error that is proportional to such stable factors as the damping coefficient of the mirror and mirror suspension and the continuous film speed, as well as inversely proportional to the gain of the servo amplifier or servo loop.

In general terms, the advance of a spring biased driven part of an optical compensator may be described by the following equation of motion:

$$F(t) = J \frac{d^2x}{dt^2} + b \frac{dx}{dt} + kx \qquad (1)$$

where

F(t) = force for advancing the driven compensator part;
J = mass-moment of inertia of the driven compensator part;
b = damping coefficient of the driven compensator part;
k = spring constant of the spring bias on the driven compensator part;
x = displacement of the driven compensator part as a function of time;
$\frac{dx}{dt}$ = velocity of the driven compensator part;
$\frac{d^2x}{dt^2}$ = acceleration of the driven compensator part.

By eliminating the spring bias on the driven compensator part, the spring term of kx disappears from the equation (1) and the equation of motion of the driven compensator part becomes:

$$F(t) = J \frac{d^2x}{dt^2} + b \frac{dx}{dt} \qquad (2)$$

This is the equation of motion of the driven compensator part in accordance with one of the main aspects of the subject invention.

Several important features are seen from equation (2). First, elimination of the spring term of $kx$ from the equation of motion leaves no term that would require the driving force to increase in proportion to the displacement of the advancing compensator part. This, in turn, eliminates the sawtooth current for driving the compensator. Secondly, once the driven compensator part has been accelerated to the required velocity, the driving current need only overcome the damping term. Velocity changes as may be required by film shrinkage or other irregularities are then easily effected by slightly increasing or decreasing the driving power that is applied to overcome damping.

Thirdly, the above mentioned combination of compensator advance in accordance with equation (2) and compensator reset by means of power pulse doublets yields a further synergistic effect if the power pulse doublet is dimensioned to have a net energy sufficient to initial an advance of the driven compensator part after completion of a resetting operation. In terms of equation (2), this means that the acceleration term of J ($d^2x/dt^2$) may at least in part be satisfied by the second pulse of the reset pulse doublet. This has the significant advantage that the compensator drive current which has to be provided by the servo system may practically be limited in amplitude to the amount required to overcome compensator damping.

Fourthly, compensator damping may be utilized as a means for providing a substantially constant torque which drives the compensator in the advance direction, and which is increased or decreased in response to film shrinkage or other irregularities. This fact will now be demonstrated with the aid of motion equations pertaining to the illustrated compensator 30 with angularly advancing mirror 40.

If the driven part of the compensator 30, including the mirror 40, is provided with a spring bias, the following differential equation of motion applies:

$$T(t) = J \frac{d^2\theta}{dt^2} + b \frac{d\theta}{dt} + k\theta \qquad (3)$$

where

T(t) = torque for angularly advancing the driven part;
J = mass-moment of inertia of the driven part;
b = damping coefficient of the driven part;
k = spring constant of the spring bias;
θ = angular advance of the driven part as a function of time;
$\frac{d\theta}{dt}$ = angular velocity of the driven part;
$\frac{d^2\theta}{dt^2}$ = angular acceleration of the driven part.

If no spring bias is employed on the driven compensator part, the equation of motion simplifies itself to:

$$T(t) = J \frac{d^2\theta}{dt^2} + b \frac{d\theta}{dt} \qquad (4)$$

where

T(t) = torque for angularly advancing the driven part;
J = mass-moment of inertia of the driven part;
b = damping coefficient of the driven part;
$\frac{d\theta}{dt}$ = angular velocity of the driven part;
$\frac{d^2\theta}{dt^2}$ = angular acceleration of the driven part.

Mainly due to the damping term of $b$ ($d\theta/dt$), an error $\theta_e$ occurs between the angular advance for perfect compensation, and the angular advance actually carried out by the mirror 40. That error is seen by the sensing device 45, since illuminated sprocket holes are projected onto the sensing device 45 by way of the compensator mirror 40. The corresponding error signal developed by the sensing device 45 is applied to the servo amplifier 55 which, in turn, energizes the mirror drive coil 41 with a current corresponding to the error signal. The latter current imposes a torque $T_e$ on the driven part of the compensator 30 including the mirror 40. That torque $T_e$ may be expressed as follows:

$$T_e = -CG\theta_e \qquad (5)$$

where
$T_e$ = torque on the driven compensator part due to the angular error $\theta_e$;
$\theta_e$ = angular error in the advance of the driven compensator part;
G = gain of servo amplifier 55;
C = proportionality factor including allowance for the optical magnification of the angular error between mirror 40 and sensing device 45, the efficiency of the sensing device 45, the conductivity of the mirror drive coil 41, and the efficiency of the mirror drive; and the minus sign indicates that the torque $T_e$ due to the angular error is made to correct the angular error.

The error torque as expressed in equation (5) and other effects of the angular error $\theta_e$ enter the equation (4) substantially as follows:

$$-CG\theta_e = J\frac{d^2\theta}{dt^2} + J\frac{d^2\theta_e}{dt^2} + b\frac{d\theta}{dt} + b\frac{d\theta_e}{dt} \quad (6)$$

The first acceleration term in equation (6) is zero for constant-velocity advancement. The first velocity term may substantially be rewritten as follows for constant-velocity advancement:

$$b\frac{d\theta}{dt} = b\frac{v}{2f} \quad (7)$$

where
 $v$ = velocity of the film 13; and
 $f$ = effective focal length of the lens 38.
Accordingly, the equation (6) may be rewritten as:

$$J\frac{d^2\theta_e}{dt^2} + b\frac{v}{2f} + b\frac{d\theta_e}{dt} + CG\theta_e = 0 \quad (8)$$

The equation (8), in turn, may be rewritten as follows:

$$J\frac{d^2\theta_e}{dt} + b\frac{d\theta_e}{dt} + CG\theta_e = -b\frac{v}{2f} \quad (9)$$

The equation (9) has a complementary solution according to which:

$$\theta_e = -\frac{bV}{2CGf} \quad (10)$$

In a given phase of operation of the projector of FIG. 1, the damping coefficient $b$, the film velocity $v$, the proportionality factor C, the amplifier gain G, and the effective focal length $f$ are substantially constant. This, in turn, leads to a substantially constant tracking error $\theta_e$ between the angular mirror advance and the continuously moving film. That tracking error results in a substantially constant displacement of the projected image relative to the projected image location that would obtain if the compensator tracking were optically perfect. As seen from equation (10), the tracking error $\theta_e$ is inversely proportional to the amplifier gain G, and may thus be reduced by increasing the gain G. The gain of the amplifier 55 is preferably above one-hundred, and may be in the thousands.

In practice, a constant displacement of the projected images on the screen 39 is not noticed by the observer, since he does not know where the images would be in the absence of the tracking error.

Combining the equations (5) and (10), we obtain the equation $$T_r = \frac{bv}{2f} \quad (11)$$

which means that the damping coefficient $b$ provides a substantially constant torque for driving the compensator mirror 40 in the advance direction. That torque is a function of the film velocity $v$, so that the driving torque provided by the mirror damping coefficient readily varies with variations in the film speed. By the same token, this torque readily adjusts itself to film shrinkage and other similar occurrences.

Interpreting this result from a somewhat different angle, it may be said that the damping of the mirror 40 leads to an electric current in the mirror drive coil 41 which provides a substantially constant torque in the mirror advance direction. As shown by the equation (11) this torque is not necessarily constant in an absolute sense, but rather is substantially constant for a given film speed and effective focal lengths of the projection lens. Also, this torque is subject to variation in response to sensed movements of the projected image.

In response to movements of the projected image in the above mentioned first direction, the servo loop including the sensing device 45 and the servo amplifier 55 increases the electric current in the drive coil 41 above the current provided in response to the damping coefficient $b$. Conversely, the servo loop decreases the electric current in the drive coil 41 below the latter current in response to sensed image movements in the above mentioned second direction. In this manner, electric drive power is applied to the compensator in response to sensed image movements in the first direction, whilst the torque mentioned in the preceding paragraph is diminished in response to sensed image movements in the second direction. The result is a mirror drive current that varies relative to a given current and that ideally need not reverse its direction during normal operation of the compensator.

It may thus be seen that the damping coefficient $b$ may effectively be employed to perform a function during the compensator advance for which a bias spring was formerly thought necessary. As indicated above, employment of the damping coefficient in lieu of a bias spring has the advantage that the mirror drive current need not have high-amplitude sawtooth excursions. Of course, the damping term does consume a certain amount of power. This power consumption is typically small if not negligible in practice.

According to another aspect of the subject invention, the need for a biasing spring against overshooting is eliminated by providing an electric bias for the compensator 30 and applying this electric bias to the compensator 30 to provide during image display a bias force at the compensator mirror 40 in a direction opposed to the direction of advance of the compensator mirror during image display. By way of example, if the compensator mirror 40 as seen in FIG. 1 angularly advances in a clockwise direction during image display, then the electric bias under consideration is applied to the compensator drive coil 41 so as to provide a biasing force at the compensator mirror 40 in a counter-clockwise direction.

In FIG. 1, a conventional source 57 of variable electric potential or current is shown connected to an input of the amplifier 55 for providing an adjustable electric bias current which is applied to the mirror drive coil 41 in order to bias the mirror 40 in the above mentioned direction.

Unlike a bias spring, the electrical bias according to the subject invention provides a biasing force that does not materially increase as a function of mirror advance.

Considering again the schematic of the sensing device 45 shown in FIG. 3, it is seen that the net voltage at the terminal 51 relative to ground will have a first polarity in response to image movements in a direction corresponding to the direction of movement of the film 13, and an opposite second polarity in response to image movements in an opposite direction. The servo amplifier 55, which has an input connected to the sensing device 45, energizes the mirror drive coil 41 in response to a signal of the mentioned first polarity to advance the mirror 40 angularly in such a sense as to maintain the projected image on the screen 39 substantially stationary. If no signal is applied to the servo amplifier 55 by the sensing device 45, then the current in the drive coil 41 corresponds to the magnitude of the electric bias provided by the source 57. The resulting bias force on the mirror 40 would drive that mirror as seen in FIG. 1 in a counter-clockwise direction. This, in turn, would result in a movement of the projected sprocket hole relatively to the sensing device 45 which would thereupon provide a signal of the above mentioned first polarity, assuming normal operation of the projector film drive.

Upon receiving the latter signal of the above mentioned first polarity, the servo amplifier 55 energizes the drive coil 41 for angular advance of the mirror 40 in a clockwise direction as seen in FIG. 1, thereby rendering the image display on the screen 39 substantially stationary.

Similarly, if the compensator mirror 40 overshoots the advance of the film 13 by excessive movement in a clockwise direction as seen in FIG. 1, the counter-clockwise biasing force at the mirror 40 provided by the electric bias source 57 operates to restore the synchronous advance of the mirror 40 relative to the moving film 13.

It is thus seen that the mirror 40 will move in a counter-clockwise direction as seen in FIG. 1 if no signal is provided by the sensing device 45. The mirror 40, moreover, will receive no drive energy when the signal of the above mentioned first polarity provided by the sensing device 45 corresponds in magnitude to the electric bias provided by the biasing source 57. In that case, the mirror 40 continues to advance under its own inertia, damped by friction and the like, but not affected by a progressively increasing bias spring torque. Accordingly, the energy for advancing the mirror 40 during image display is minimal as compared to the energy required in spring-biased compensator systems.

The net voltage of the above mentioned first polarity provided by the sensing device 45 decreases as the mirror 40 overshoots its advance relative to the moving film 13. In that case, the signal provided by the sensing device 45 does no longer balance the electric bias provided by the source 57. Rather, the bias provided by the source 57 exceeds the net voltage provided by the sensing device 45, thereby producing on the mirror 40 a net force that acts in a counter-clockwise direction as seen in FIG. 1 and that, accordingly, restores synchronism between the mirror advance and the continuous film movement.

The electric bias according to the subject invention performs yet another important function without imposing on the system of the above mentioned detriments of a spring bias for the compensator 40. As will appear in the further course of this disclosure, the compensator mirror 40 is automatically reset upon completion of an image display and preparatory to the display of the next image. The electric bias according to the subject invention also provides an automatic resetting of the mirror 40 in the case of a damaged sprocket hole or other factor which disables the servo system from properly locking in on an image (or on the particular sprocket hole, to be exact). In consequence, even when a disturbance prevents the mirror 40 from reaching its maximum advanced position, the electric bias according to the subject invention will still reset the mirror to its initial angular position for a reception and processing of the next image to be displayed.

In practice, the electric bias is set for optimum performance by observing the projected images on the screen 39 and adjusting the source 57 until the steadiest image display is achieved.

The subject invention provides yet another feature which may be employed either in conjunction with or independently of the electric bias disclosed above. This feature is based on the fact that the sensing device 45 not only provides a net voltage of a first polarity in response to movements of the projected image in a first direction corresponding to the direction of film advance, but provides also a net voltage of an opposite second polarity in response to image movements in an opposite direction. According to the subject invention, the servo system supplies the compensator 30 with decelerating power in response to sensed image movements in the latter opposite direction.

Considering in this connection again the schematic of the sensing device 45 shown in FIG. 3, it is seen that the net voltage at the terminal 51 relative to ground will have a first polarity in response to image movements in the first direction, and an opposite second polarity in response to image movements in the second direction. The amplifier 55 is so constructed that it provides in the compensator coil 41 electric currents which have a predetermined sense of current flow in response to the named first polarity of the image movement sensing signal, and which alternatively have an opposite sense of current flow in response to the named second polarity of the image movement sensing signal.

In consequence, the servo system including the amplifier 55 alternatively develops and applies to the compensator coil 41 both motive or driving power and decelerating power. The driving power is applied in response to sensed image movements in the first direction, and the decelerating power is applied in response to sensed image movements in the second direction.

Accordingly, the advancing compensator mirror is subjected to continuous control in both directions about its axis of rocking motion, and a mirror bias spring is unnecessary. The combination of motive powers and decelerating powers has the overall effect of angularly moving the compensator mirror 40 in a net forward direction to compensate for the continuous movement of the film 13 and to maintain practically each displayed image substantially stationary.

Figure 4:
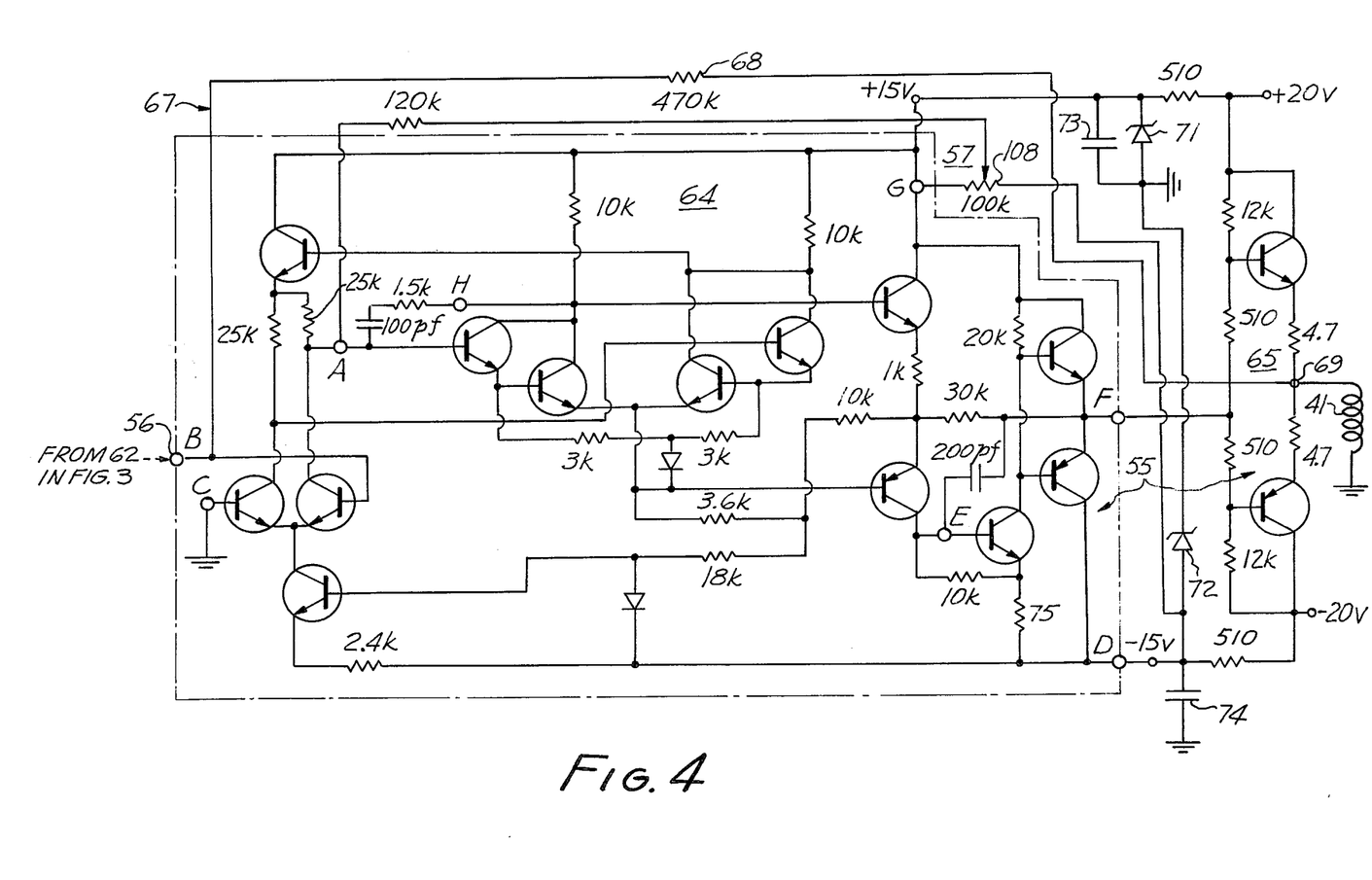
FIG. 4 is a circuit diagram of a servo amplifier and mirror drive of the projector of FIG. 1.

According to FIGS. 3 and 4, the motion sensing device 45 may be connected to the amplifier input terminal 56 through resistors 60 and 61 and a terminal 62. The resistor 60 is adjustable to render the loop gain variable. A capacitor 63 is connected in parallel to the resistors 60 and 61. The combination of resistors 60 and 61 and capacitor 63 provides an adjustable electric damping network, the damping term of which enters the above equation (4) in addition to the damping caused by the damping coefficient of the compensator mirror 40 and other driven compensator parts.

A preferred amplifier 55 is illustrated in FIG. 4 and comprises an operational amplifier 64 and a complementary emitter follower output stage 65. Those skilled in the art of integrated circuits will recognize that the operational amplifier 64 is available in monolithic form from several manufacturers as standardized circuit 1709 (for instance, MOTOROLA OPAMP MC1709C). Accordingly, a detailed elaboration on the circuit diagram of opamp 64 beyond its illustration in FIG. 4 is unnecessary.

The output stage 65 of the amplifier 55 is of a conventional complementary emitter follower stage design that also does not require any special elaboration as to its circuitry. The feedback path 67 for the amplifier 55, with a feedback resistor 68, is connected between the amplifier output 69 and the amplifier input 56. The compensator coil 41 is connected to the amplifier output 69. The supply voltage stabilizer with Zener diodes 71 and 72 and filter capacitors 73 and 74 is also conventional.

In considering FIG. 4, it will be noted that the amplifier 55, with amplification and output stages 64 and 65, has a bidirectional output in response to a bidirectional input. In this manner, the motive or driving power is applied to the compensator coil 41 in response to displayed image movements in the above mentioned first direction, while decelerating power may be applied to the compensator coil 41 in response to displayed image movements in the above mentioned second direction.

In the illustrated preferred embodiments, all three of the above-identified methods of the subject invention are available. Thus, a damping coefficient which leads to the above mentioned substantially constant torque in the forward direction is mainly provided by a suitable mirror mount (see FIGS. 8 and 9 and their accompanying description below). The above mentioned source 57 of adjustable electric bias is in FIG. 4 provided by a potentiometer 108 connected between positive and negative terminals of the regulated direct-current power source.

The potentiometer 108 has its movable wiper connected to a second input A of the amplifier 64. In this manner, it is possible to electrically bias the compensator mirror 40 in a direction opposite to the direction of mirror advance. If the film 13 is run backwardly, the latter compensator mirror bias may be reversed by adjusting the potentiometer 108. The potentiometer 108 may also be employed for adjusting the position of projected images and sprocket holes relative to the screen 39 or sensing device 45.

In practice, the damping of the compensator mirror 40 tends to provide the above mentioned substantially constant torque at the mirror. The electric bias provided by the source 57 may be employed to counter that torque to an adjustable extent resulting in optimum performance of the compensator mirror in the advance direction. The mirror drive current will be increased in response to sensed image movements in the above mentioned first direction. Conversely, the mirror drive current will be diminished in response to sensed image movements in the above mentioned second direction.

This mode of operation is generally preferred for image movements in the second direction which are below or equal to a predetermined value representing image movements of a normally occurring type. Because of the capability of the illustrated embodiments to supply both driving power and decelerating power, image movements in the mentioned second direction which exceed the latter predetermined value are automatically countered by the development and application of decelerating power to the compensator drive coil 41.

This combined approach according to the illustrated preferred embodiments is thus capable of handling the various problems that occur in practical continuous motion picture projectors and similar display apparatus, such as microfilm readers and the like.

Upon completion of the display of an image, the compensator mirror 40 is angularly reset preparatory to the display of the next image. This resetting is effected by timed electric pulse doublets applied to the compensator coil 41. If the polarity of the mirror advance driving power is considered positive, then the resetting doublet 80 comprises a negative pulse 81 followed by a positive pulse 82. The negative pulse 81 angularly drives the mirror 40 backwards at high speed, and the succeeding positive pulse 82 of the doublet prevents an overshooting of the mirror 40 in the reverse direction. This does away with the necessity of a mechanical stop or motion arresting device which has proved its demerits in prior art systems as a fertile source of wear and tear, noise, jitter and other trouble.

The projector 10 of FIG. 1 has a doublet generator 84, a preferred diagram of which is shown in FIG. 3. The doublet generator 84 is timed by a photosensor 85 which, in the embodiment of FIG. 1, is located at the film gate 12. The photosensor 85 acts through a monitor aperture 86. As illustrated in FIG. 2, the monitor aperture 86 is so positioned in the film gate 12 that a sprocket hole 25 appears thereat whenever the projection of an image fram has been completed.

According to FIG. 3, a conventional photosensor darlington circuit 88 may be employed in the sensor 85. Upon passage of a sprocket hole, the darlington 88 provides a pulse of the type shown at 90 in FIG. 3. A differentiator circuit 91 converts the pulse 90 into a spike 92. A second differentiation spike is shown in dotted outline, since it is suppressed by a diode 93 in the differentiator 91.

The spike 92 drives a one-shot multivibrator 94 of a conventional type, producing a pulse 95 at a contact F and a pulse 96 at a contact R. The contacts F and R form part of a switch 98. When the projector is set for forward film motion, the switch 98 is in the solidly illustrated position, so that the pulse 95 is applied to a differentiating network 99 via the contact F. In response, the differentiator 99 produces the two oppositely poled spikes 100 shown at the terminal 62.

The terminal 62 being connected to the amplifier input 56, the spike signal 100 is applied to the amplifier 55. The amplitudes of the spikes 100 are such as to drive the amplifier 55 into saturation. This is an important feature since it dispenses with the need of a circuit for disconnecting the image movement sensor 45 during mirror resetting operations. In other words, the oppositely poled spikes 100 not only provide for the requisite pulse doublets, but also effect an automatic suspension of the control operation of the image movement sensor 45 during mirror flyback.

An arrow 102 adjacent the spike signal 100 symbolically leads to the pulse doublet 80 as it appears at the output 69 of the amplifier 55, and as it is applied to the compensator coil 41 to initiate and timely terminate the requisite mirror flyback preparatory to a display of the next image. A potentiometer 97 in the multivibrator 94 permits an adjustment of the doublet pulse energy. This may in accordance with a preferred embodiment of the subject invention be exploited to dimension the power pulse doublet 80 so that it has a net energy sufficient to initiate an advance of the driven compensator part, including the mirror 40, upon completion of the resetting operation. In this manner at least part of the forward acceleration of the compensator system may be provided by the resetting power generator, rather than by the servo loop. This further reduces the power which the servo loop has to supply.

If it is desired to display the motion picture film 13 backwards, the switch 98 is actuated to its illustrated dotted position. This causes the pulse 96 to be applied via the contact R to the differentiator 99. The switch 98 may be ganged with an actuator 104 of a forward-or-reverse gear 105 in the film drive that causes forward advance of the film 13 in the F-position, and reversal of the film travel in the R-position. As mentioned above, the direct-current bias provided by the bias source 57 may then also be reversed by adjustment of the potentiometer 108 shown in FIG. 4.

Application of the pulse 96 to the differentiator 99 in lieu of the pulse 95 causes a polarity reversal of the pulse doublet 80, making the first pulse 81 relatively positive and the second pulse relatively negative. Accordingly, the compensator mirror is angularly reset in what was formerly the advance direction, and is angularly advanced in what was formerly the resetting direction.

A further element of versatility is introduced by the fact that the compensator drive 41 is not slaved to any routine cam advance or sawtooth function generator. Accordingly, the compensator drive and mirror 40 automatically follow adjustments in film drive speed. Thus, one adjustment of the film drive speed control at 15 is all that is necessary for varying the rate of motion picture display. The lack of a mirror bias spring avoids film speed adjustment difficulties that arose in prior-art apparatus. With spring-biased compensators, the danger exists that the system starts to oscillate during its operation. A high value of the bias spring constant would result in a high resonant frequency, but would also increase the amplitude of the driving power for the compensator. In fact, the required drive power increases approximately with the third power of the natural frequency of the compensator. Accordingly, it has been advantageous to put practical limits on the bias spring constant. This, in turn, has seriously limited the range of film speed.

With the mirror spring bias eliminated in accordance with the subject invention, the latter limitations are removed, and the film speed may be varied in a wide range.

The image motion sensor 45' of FIG. 6 differs from the sensor 45 of FIG. 5 in that the photocell 47 is replaced by a voltage source 110 with potentiometer 112. The voltage source is so poled and the potentiometer is so adjusted that the voltage provided by the photocell 48 cancels the voltage provided by the potentiometer when, say, one-half of the photosensitive part of the photocell 48 is illuminated. It is then possible to sense positive and negative movements of the displayed image in response to increases and decreases in the area of illumination of the photocell 48. A similar effect is in accordance with FIG. 7 produced when the photocell 47 is exposed to relatively stable light, while only the photocell 48 is exposed to the sprocket hole image 53.

While the sensor of FIGS. 6 and 7 present workable solutions, the sensor according to FIGS. 3 and 5 is preferred for its greater accuracy and ease of operation.

Figure 8:
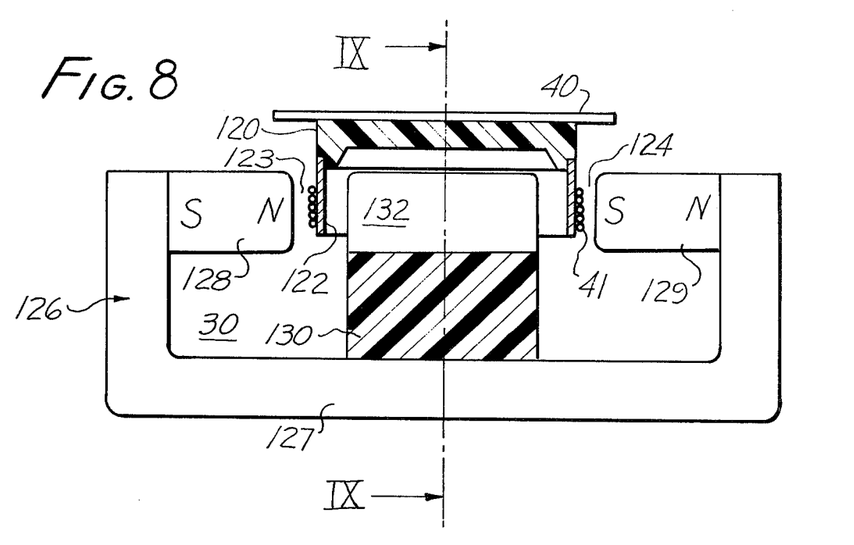
FIG. 8 is a side view, partially in section, of a compensator for use in the practice of the subject invention.
Figure 9:
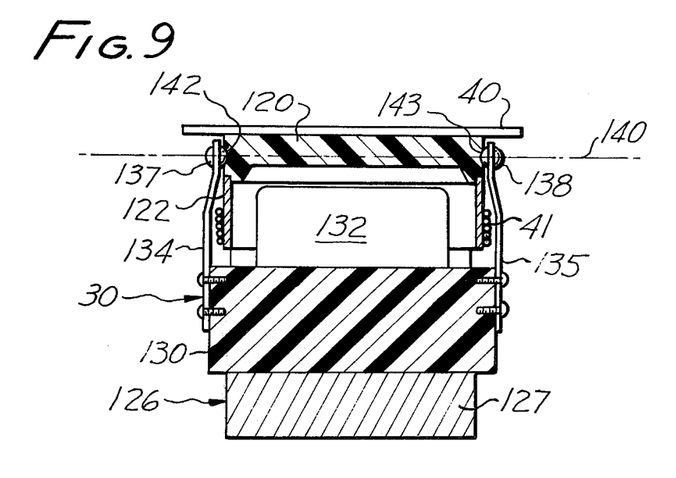
FIG. 9 is a section along line IX — IX in FIG. 8.

A preferred construction of the compensator 30 is shown in FIGS. 8 and 9. According to these figures, the compensator mirror 40 is cemented on a headpiece 120 of non-magnetic material. In a prototype of the illustrated compensator, the headpiece 120 is made of Delrin, an acetal resin made by E. I. Du Pont de Nemours & Company. The compensator drive coil 41 is wound on a tube 122 which is cemented to the headpiece 120. The tube 122 is of non-magnetic material. In principle, the tube may be of an electrically conducting material, such as aluminum, to provide for electrodynamic damping of the compensator. We presently prefer, however, a tube which is neither magnetic nor electrically conducting. In short, the tube 122 is preferably non-magnetic and electrically insulating. The tube 122 partially extends in air gaps 123 and 124 of a magnetic armature 126.

The armature 126 comprises a yoke 127 of soft magnetic material with permanent-magnet pole pieces 128 and 129. A post 130 of non-magnetic material (such as a hard plastic resin) is mounted on the yoke 127. A center core 132 is mounted on the post 130 so as to be located between the pole pieces 128 and 129; being spaced therefrom by the airgaps 123 and 124.

A pair of leaf springs 134 and 135 is mounted on the post 130 as shown in FIG. 9. By way of example, these springs may be beryllium leaf springs. Each leaf spring carries a small steel ball 137 or 138. These steel balls act as pivots which mount the headpiece 120 for angular movement about an axis 140. To this effect, the headpiece 120 has small cavities 142 and 143 for receiving the steel balls 137 and 138. If desired, the steel balls may be replaced by semicircular projections of the springs 134 and 135.

Considering FIGS. 8 and 9, it will be noted that the mirror 40, winding 41, headpiece 120, and tube 122 form a driven part of the compensator which is mounted for angular movement about the axis 140. There is no bias spring on this driven part which, accordingly, obeys an equation of motion was set forth above in equation (4).

By way of experimentation, low-friction jewel bearings were used for mounting the driven compensator part. The resulting compensator mirror control was inferior to that obtained with friction bearings of the type provided by the steel balls 137 and 138 and cavities 142 and 143. We therefore prefer friction bearings which increase the damping coefficient b in the above equations (2) and (4) beyond the coefficient due to other forms of damping, such as air damping on the driven part and electrical damping in the servo system. With this we do not intend to exclude the use of low-friction bearings categorically, inasmuch as the above mentioned electrical bias provided by the source 57, and decelerating power provided in response to sensed image movements, are available for biasing or stabilizing the compensator mirror. However, it has been our experimental experience to date that a deliberate friction on the driven compensator part constitutes a particularly advantageous means for providing a steady torque on the compensator mirror 40.

By the same token, it should be understood that we do not categorically exclude the provision of any spring at the driven compensator part. For instance, our above mentioned concepts concerning provision of an electric bias by the adjustable bias source 57, and generation of decelerating power in response to certain image movements, may be practiced with spring biased compensators, and weak spring suspensions are feasible which have such a low spring constant that the above equations (2) and (4) are satisfied for practical intents and purposes.

We do stress, however, that the lack of a bias spring or the presence of only a negligible spring constant at the driven compensator part is essential for the practice of those of our disclosed inventive concepts that rely on the above equation of motion (2) and (4), and that we also prefer the lack of a bias spring or the presence of only a negligible spring constant for those concepts of our invention that are not by definition limited to a compensator advance in accordance with equations (2) and (4). Our latter preference is mainly founded on the above mentioned fact that bias springs or suspension springs or wires with noticeable spring constant require increasing compensator drive currents and introduce resonant oscillation problems.

It will now be recognized that the subject invention removes the stumbling blocks which have beset the development of economical continuous motion picture projectors for 75 years, and provides continuously operating image display methods and apparatus that are competitive with and technically superior to intermittent projection techniques and equipment.

We claim:

1. In a method of displaying images of a succession of recordings from a substantially continuously moving carrier, with the aid of an electrically powered optical compensator of a type having a driven compensator part which is repeatedly advanced through a range of motion to compensate for the continuous carrier movement, and which is reset between successive advancements, the improvement comprising in combination the steps of:

advancing said driven compensator part through said range of motion in accordance with substantially the following equation of motion:

$$F(t) = J \frac{d^2x}{dt^2} + b \frac{dx}{dt}$$

where

F(t) = force for advancing the driven compensator part;
J = mass-moment of inertia of the driven compensator part;
b = damping coefficient of the driven compensator part;
$\frac{dx}{dt}$ = velocity of the driven compensator part;
$\frac{d^2x}{dt^2}$ = acceleration of the driven compensator part;

applying a substantially constant driving torque to said driven compensator part in response and proportional to said damping coefficient b;
applying a variable electric bias to said compensator for biasing during image display said driven compensator part in a direction opposed to the advance direction;
sensing relative movements of each displayed image;
controlling the application of electric power to said compensator in response to sensed image movements to advance the driven compensator part through said range of motion to render the display of each image substantially stationary;
providing for each reset of the driven compensator part electric resetting power comprising an electric power pulse doublet; and
applying said electric resetting power comprising said electric power pulse doublet to said compensator for resetting said driven compensator part through said range of motion upon completion of the display of an image and preparatory to the display of the next image.

2. A method as claimed in claim 1, wherein:
said sensing of relative image movements includes the steps of sensing relative movements of each displayed image in a first direction corresponding to the direction of movement of the carrier, and in a second direction extending opposite to said first direction; and
said control of the application of electric power to said compensator includes the steps of providing and applying to said compensator electric drive power in response to sensed image movements in said first direction, and diminishing said torque in response to sensed image movements in said second direction.

3. A method as claimed in claim 2, wherein:
said power pulse doublet is dimensioned to have a net energy sufficient to initiate an advance of said driven compensator part after completion of a resetting operation.

4. In a method of displaying images of a succession of recordings from a substantially continuously moving carrier, with the aid of an electrically powered optical compensator of a type having a driven part including a compensator mirror being repeatedly and angularly advanced through a range of motion to compensate for the continuous carrier movement, and being angularly reset between successive advancements, the improvement comprising in combination the steps of:

advancing said driven compensator part in accordance with substantially the following equation of motion:

$$T(t) = J \frac{d^2\theta}{dt^2} + b \frac{d\theta}{dt}$$

wherein

T(t) = torque for angularly advancing the driven part;
J = mass-moment of inertia of the driven part;
b = damping coefficient of the driven part;
$\frac{d\theta}{dt}$ = angular velocity of the driven part;
$\frac{d^2\theta}{dt^2}$ = angular acceleration of the driven part;

sensing relative movements of each displayed image;
controlling the application of electric power to said compensator in response to sensed image movements to angularly advance said compensator mirror through said range of motion to render the display of each image substantially stationary;
applying a substantially constant driving torque in response and proportional to said damping coefficient b to said driven part including said compensator mirror;

applying a variable electric bias to said compensator for biasing during image display said driven compensator part in a direction opposed to the advance direction;

providing for each reset of the compensator mirror electric resetting power comprising an electric power pulse doublet; and applying said electric resetting power comprising said electric power pulse doublet to said compensator for resetting said compensator mirror through said range of motion upon completion of the display of an image and preparatory to the display of the next image.

5. A method as claimed in claim 4, wherein:

said sensing of relative image movements includes the steps of sensing relative movements of each displayed image in a first direction corresponding to the direction of movement of the carrier, and in a second direction extending opposite to said first direction; and said control of the application of electric power to said compensator includes the steps of providing and applying to said compensator electric drive power in response to sensed image movements in said first direction, and diminishing said substantially constant torque in response to sensed image movements in said second direction.

6. A method as claimed in claim 5, wherein:

said power pulse doublet is dimensioned to have a net energy sufficient to initiate an advance of said driven part including said compensator mirror after completion of a resetting operation.

7. In a method of displaying images of a succession of recordings from a substantially continuously moving carrier, with the aid of an electrically powered optical compensator of a type being repeatedly advanced through a range of motion to compensate for the continuous carrier movement, and being reset between successive advancements, the improvement comprising in combination the steps of:

providing an electric bias for said compensator;

applying said electric bias to said compensator to provide during image display a biasing force at said compensator in a direction opposed to the direction of compensator advance during image display;

sensing relative movements of each displayed image;

controlling the application of electric power to said compensator in response to sensed image movements to render the display of each image substantially stationary;

providing for each compensator reset electric resetting power comprising an electric power pulse doublet; and applying said electric resetting power comprising said electric power pulse doublet to said compensator for resetting said compensator through said range of motion upon completion of the display of an image and preparatory to the display of the next image.

8. A method as claimed in claim 7, wherein:

said power pulse doublet is dimensioned to have a net energy sufficient to initiate an advance of said compensator after completion of a resetting operation.

9. A method as claimed in claim 7, wherein:

said sensing of relative image movements includes the steps of sensing relative movements of each displayed image in a first direction corresponding to the direction of movement of the carrier, and in a second direction extending opposite to said first direction; and said control of the application of electric power to said compensator includes the steps of providing and applying to said compensator electric driving power for advancing said compensator in response to sensed image movements in said first direction, and of reducing said driving power in response to sensed image movements in said second direction.

10. In a method of displaying images of a succession of recordings from a substantially continuously moving carrier, with the aid of an electrically powered optical compensator of a type being repeatedly advanced by motive power through a range of motion to compensate for the continuous carrier movement, the improvement comprising in combination the steps of:

sensing relative movement of each displayed image in a first direction corresponding to the direction of movement of the carrier, and in a second direction extending opposite to said first direction;

developing and applying to said optical compensator said motive power in response to sensed image movements in said first direction to advance said optical compensator through said range of motion to render the display of each image substantially stationary;

developing decelerating power in response to sensed image movements in said second direction, and applying said developed decelerating power to said optical compensator to improve the stationary condition of displayed images for which a movement in said second direction has been sensed; and resetting said optical compensator through said range of motion upon completion of the display of substantially each image and preparator to the display of the next image;

said optical compensator being reset by providing for each reset of the compensator electric resetting power comprising an electric power pulse doublet, and applying said electric resetting power comprising said electric power pulse doublet to said compensator substantially upon completion of the display of an image and preparatory to the display of the next image;

said optical compensator having a driven part which is repeatedly advanced and reset through said range of motion; and said driven compensator part being advanced in accordance with substantially the following equation of motion;

$$F(t) = J \frac{d^2x}{dt^2} + b \frac{dx}{dt}$$

where $F(t)$ = force for advancing the driven compensator part;
$J$ = mass-moment of inertia of the driven compensator part;
$b$ = damping coefficient of the driven compensator part;
$\frac{dx}{dt}$ = velocity of the driven compensator part;
$\frac{d^2x}{dt^2}$ = acceleration of the driven compensator part.

11. A method as claimed in claim 10, wherein:

a substantially constant driving torque in response and proportional to said damping coefficient $b$ is applied to said driven compensator part.

12. A method as claimed in claim 11, wherein:
said decelerating power is developed and applied to said compensator in response to image movements in said second direction exceeding a predetermined value; and
said substantially constant torque is diminished in response to sensed image movements in said second direction below or equal to said predetermined value.

13. In a method of displaying images of a succession of recordings from a substantially continuously moving carrier, with the aid of an electrically powered optical compensator of a type having a driven part being repeatedly advanced by motive power through a range of motion to compensate for the continuous carrier movement, the improvement comprising in combination the steps of:
advancing said driven compensator part in accordance with substantially the following equation of motion:

$$F(t) = J \frac{d^2x}{dt^2} + b \frac{dx}{dt}$$

where $F(t)$ = force for advancing the driven compensator part;
$J$ = mass-moment of inertia of the driven compensator part;
$b$ = damping coefficient of the driven compensator part;
$\frac{dx}{dt}$ = velocity of the driven compensator part;
$\frac{d^2x}{dt^2}$ = acceleration of the driven compensator part.

providing and applying to said compensator a variable electric bias for adjustably biasing said driven compensator part in a direction opposed to the advance direction;
applying to said driven compensator part a substantially constant driving torque in response and proportional to said damping coefficient $b$;
sensing relative movements of each displayed image in a first direction corresponding to the direction of movement of the carrier, and in a second direction extending opposite to said first direction;
developing and applying to said optical compensator said motive power in response to sensed image movements in said first direction to advance said optical compensator through said range of motion to render the display of each image substantially stationary;
developing decelerating power in response to image movements in said second direction exceeding a predetermined value and applying said developed decelerating power to said optical compensator to improve the stationary condition of displayed images for which a movement in said second direction exceeding said predetermined value has been sensed;
diminishing said torque in response to sensed image movements in said second direction equal to said predetermined value, and in response to sensed image movements below said predetermined value; and
resetting said driven part through said range of motion by providing for each reset of the driven part electric resetting power comprising an electric power pulse doublet and by applying said electric resetting power comprising said electric power pulse doublet to said compensator substantially upon completion of the display of an image and preparatory to the display of the next image.

14. In a method of displaying images of a succession of recordings from a substantially continuously moving carrier, with the aid of an electrically powered optical compensator of a type being repeatedly advanced by motive power through a range of motion to compensate for the continuous carrier movement, the improvement comprising in combination the steps of:
sensing relative movements of each displayed image in a first direction corresponding to the direction of movement of the carrier, and in a second direction extending opposite to said first direction;
developing and applying to said optical compensator said motive power in response to sensed image movements in said first direction to advance said optical compensator through said range of motion to render the display of each image substantially stationary;
developing decelerating power in response to sensed image movements in said second direction, and applying said developed decelerating power to said optical compensator to improve the stationary condition of displayed images for which a movement in said second direction has been sensed; and
resetting said optical compensator through said range of motion upon completion of the display of substantially each image and preparatory to the display of the next image;
said optical compensator having a movable compensator mirror which is advanced through a range of angular motion;
said motive power being developed and applied to said optical compensator in response to sensed image movements to advance said compensator mirror through said range of angular motion to render the display of each image substantially stationary;
said compensator mirror being reset through said range of angular motion upon completion of the display of substantially each image and preparatory to the display of the next image;
said compensator mirror being reset by providing for each compensator reset electric resetting power comprising an electric power pulse doublet, and applying said electric resetting power comprising said electric power pulse doublet to said compensator substantially upon completion of the display of an image and preparatory to the display of the next image; and
said compensator mirror being included in an angularly driven part of said compensator, said angularly driven part being advanced substantially in accordance with substantially the following equation of motion:

$$T(t) = J \frac{d^2\theta}{dt^2} + b \frac{d\theta}{dt}$$

wherein

T(t) = torque for angularly advancing the driven part;
J = mass-moment of inertia of the driven part;
b = damping coefficient of the driven part;
$\frac{d\theta}{dt}$ = angular velocity of the driven part;
$\frac{d^2\theta}{dt^2}$ = angular acceleration of the driven part;

15. A method as claimed in claim 14, wherein:
a substantially constant driving torque in response and proportional to said damping coefficient *b* is applied to said driven part including said compensator mirror.

16. A method as claimed in claim 15, wherein:
said decelerating power is developed and applied to said compensator in response to image movements in said second direction exceeding a predetermined value; and
said substantially constant torque is diminished in response to sensed image movements in said second direction below or equal to said predetermined value.

17. In a method of displaying images of a succession of recordings from a substantially continuously moving carrier, with the aid of an electrically powered optical compensator of a type having an angularly driven part including an angularly movable compensator mirror being repeatedly advanced by motive power through a range of angular motion so as to compensate for the continuous carrier movement, the improvement comprising in combination the steps of:
advancing said angularly driven part substantially in accordance with the following equation of motion:

$$T(t) = J \frac{d^2\theta}{dt^2} + b \frac{d\theta}{dt}$$

wherein

T(t) = torque for angularly advancing the driven part;
J = mass-moment of inertia of the driven part;
b = damping coefficient of the driven part;
$\frac{d\theta}{dt}$ = angular velocity of the driven part;
$\frac{d^2\theta}{dt^2}$ = angular acceleration of the driven part;

providing and applying to said compensator a variable electric bias for adjustably biasing said compensator mirror in a direction opposed to the advance direction;
sensing relative movements of each displayed image in a first direction corresponding to the direction of movement of the carrier, and in a second direction opposite said first direction;
developing and applying to said optical compensator said motive power in response to sensed image movements to advance said compensator mirror through said range of angular motion to render the display of each image substantially stationary;
developing decelerating power in response to sensed image movements in said second direction, and applying said developed decelerating power to said optical compensator to improve the stationary condition of displayed images for which a movement in said second direction has been sensed; and
resetting said compensator mirror through said range of angular motion upon completion of the display of substantially each image and preparatory to the display of the next image by providing for each compensator reset electric resetting power comprising an electric power pulse doublet, and applying said electric resetting power comprising said electric power pulse doublet to said compensator substantially upon completion of the display of an image and preparatory to the display of the next image.

* * * * *